United States Patent [19]
Göthberg

[11] 4,391,426
[45] Jul. 5, 1983

[54] SUPPORT STRIP WITH U-SHAPED CROSS-SECTION OF PLASTIC MATERIAL FOR SUPPORTING CONDUITS, CABLES AND THE LIKE

[76] Inventor: Owe Göthberg, Alsätravägen 176, 127 36 Skärholmen, Sweden

[21] Appl. No.: 337,260

[22] Filed: Jan. 5, 1982

[30] Foreign Application Priority Data

Jan. 8, 1981 [SE] Sweden .............................. 8100077

[51] Int. Cl.³ .............................................. F16L 3/00
[52] U.S. Cl. .................................... 248/49; 138/115; 174/97; 174/101
[58] Field of Search .......................... 248/49, 68 R, 65; 174/97, 68 C, 101, 48; 138/108, 115; 211/74

[56] References Cited

U.S. PATENT DOCUMENTS

| | | | |
|---|---|---|---|
| 3,118,017 | 1/1964 | Wimbish | 174/97 |
| 3,488,965 | 1/1970 | Chesnov | 52/594 |
| 3,497,213 | 2/1970 | Stanwood | 52/579 |
| 3,992,839 | 11/1976 | LaBorde | 52/594 |
| 4,173,382 | 11/1979 | Booty | 174/48 |
| 4,286,630 | 9/1981 | Happer | 174/101 |
| 4,305,430 | 12/1981 | Svensson | 174/48 |

FOREIGN PATENT DOCUMENTS

1604260 12/1981 United Kingdom .................. 211/74

*Primary Examiner*—William H. Schultz
*Assistant Examiner*—Ramón O. Ramíirez
*Attorney, Agent, or Firm*—Silverman, Cass & Singer, Ltd.

[57] ABSTRACT

A support strip (FIG. 2) of plastic material with U-shaped cross-section and for supporting conduits, cables etc. has a substantially plane bottom (2) and side walls (3), which support strip (1) in its bottom surface close to the longitudinal edges of the support strip has a groove (5) extending along the entire length of the support strip with opposed grip edges (6,7). The free outer edge of each side wall (3) is formed along its entire length with a substantially cylindric bead (8), the diameter of which is slightly smaller than the width of the groove (5) and greater than the distance between the grip edges. Both beads (8) are located at the same distance from the bottom (2) and in a plane (x) extending perpendicularly to the bottom and in the central longitudinal line of the respective groove. The support strip (1) further comprises two internal support walls (10) spaced from each other and in parallel with the side walls (3), which support walls (10) at their outer end are formed with stop strips (11) for retaining conduits, cables etc. placed in the support strip. The mutual distance between the grooves (5) and, respectively, beads (8) of the support strips is equal, so that two or more support strips can be coupled together, in that the beads (8) of one support strip are pressed into the grooves (5) of the other support strip whereby a snap connection between the support strips is formed.

3 Claims, 6 Drawing Figures

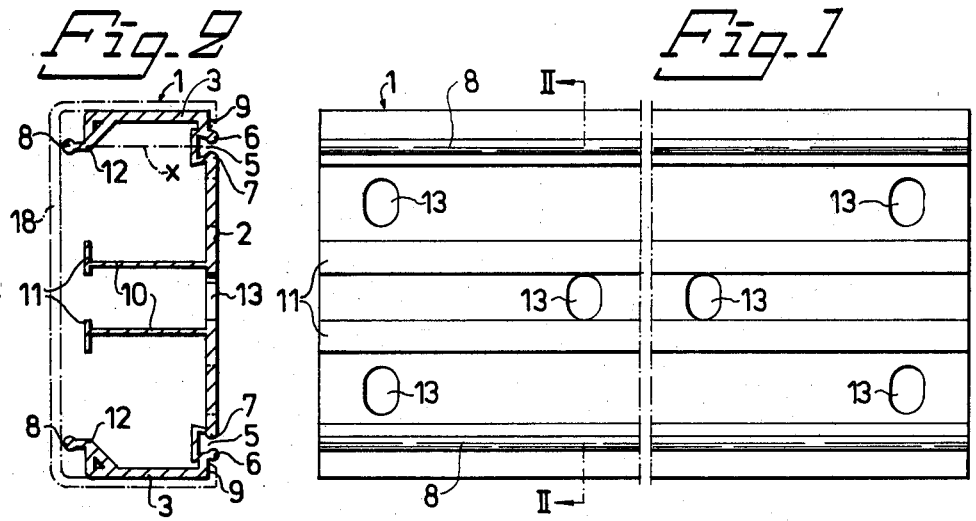
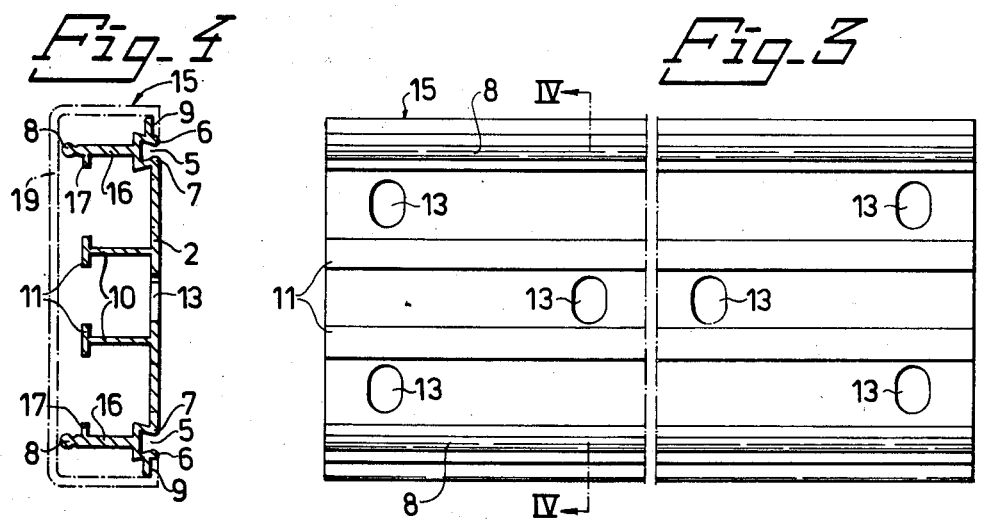
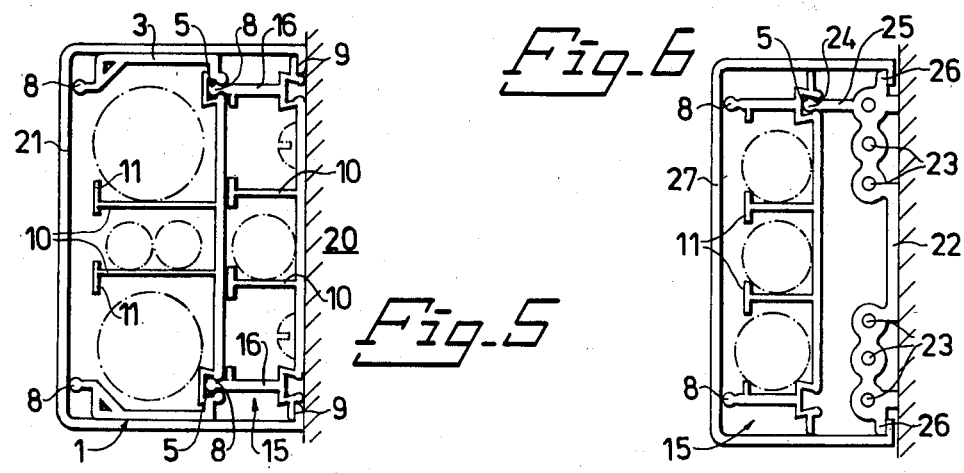

SUPPORT STRIP WITH U-SHAPED CROSS-SECTION OF PLASTIC MATERIAL FOR SUPPORTING CONDUITS, CABLES AND THE LIKE

This invention relates to a support strip of plastic material with U-shaped cross-section for supporting conduits, cables etc. The strip has a substantially plane bottom and is provided with grip members for its mounting on another similar support strip or on a wall.

At modern electric installations in buildings, it is known to assemble the electric wires in the form of so-called electric strips on the outside of walls and to cover them with a strip-shaped cover section. The Laid-Out Document No. SE 356 485, for example, describes a prefabricated electric strip with bare wires baked-in in plastic and arranged one to the side of each other, so that a substantially plane strip is obtained which is mounted on a wall and covered by a cover section, which detachably engages with the electric strip. It is, certainly, possible to place radio and television or other communication circuit cables inside said cover section, but no conduits, cables etc. of greater dimension, which often may be required, can be arranged there.

The present invention has the object to provide a U-shaped support strip, which not only can carry conduits, cables etc. of great dimension and be attached on a wall or the like, but which also can be detachably attached to an electric strip of the aforesaid kind or to an additional support strip of the same kind as the first-mentioned one.

This object is achieved according to the present invention by a support strip, which has been given the characterizing features as defined in the attached claims.

The invention is illustrated by some embodiments thereof shown by way of example in the accompanying drawing, in which:

FIG. 1 is a front view of a support strip according to the invention, a central portion of which is cut away, FIG. 2 is a cross-section along the line II—II in FIG. 1, FIG. 3 is a front view of a modified support strip according to the invention, a central portion of which is cut away, FIG. 4 is a cross-section along the line IV—IV in FIG. 3, FIG. 5 is an end view of the support strips according to FIGS. 1 and 3 coupled together, FIG. 6 is an end view of the support strip according to FIG. 3 coupled together with an electric strip.

According to the embodiment shown in FIGS. 1 and 2, the substantially U-shaped support strip 1 of plastic material, for example PVC-plastic, comprises a plane bottom 2 and substantially plane side walls 3. The length may be 10-250 cm. The bottom 2 is provided at each of its longitudinal outer portions with a groove 5, which extends along the entire support strip 1 and is open in the bottom outer surface and has rounded grip edges 6,7 at a short distance from each other. The free longitudinal outer edge of each side wall 3 is formed along the entire length of the support strip 1 with a bead 8, the cross-section of which constitutes almost a whole circle area, the diameter of which is slightly smaller than the width of a groove 5, but slightly greater than the distance between the grip edges 6,7 of the groove.

The respective bead 8 extends in a plane x lying perpendicularly to the bottom 2 in the central longitudinal line of the groove 5.

Each of the longitudinal outer portions of the bottom 2 is formed with a shoulder 9. From the inside of the bottom 2 two relatively rigid but slightly elastic support walls 10 project spaced from each other and extend along the entire length of the support strip 1. The outer longitudinal edge of said walls is formed with stop strips 11 projecting on each side of the wall 10. Each side wall 3, besides, is provided with a stop edge 12 flushing with the stop strips 11. The bottom 2 further is provided with distributed, slightly oblong holes 13 for screws, if the support strip is to be attached to a wall or the like.

The support strip 15 shown in FIGS. 3 and 4 has substantially the same design as the strip shown in FIGS. 1 and 2, and identical details in FIGS. 1–4 are designated by the same reference numerals. One difference distinguishing the support strip shown in FIGS. 3 and 4 is, that the side walls 16 are attached slightly inside the outer longitudinal edges of the bottom 2, which edges are provided with shoulders 9, and that, thus, both the side walls 16 and their bead 8 are located in said plane which extends perpendicularly to the bottom 2 on the central longitudinal line of the grooves. The side walls 16 comprise stop strips 17 directed against each other and flushing with said stop strips 11.

It applies to both strip designs, that they can be covered by a top or cover section 18 and, respectively, 19, which are indicated in FIGS. 2 and 4 by dash-dotted lines and detachably engage with the side shoulders 9 of the support strips.

FIG. 5 shows how advantageously the support strips 1 and 15 designed according to the invention can be coupled together. The support strip 15 is attached to a wall 20 and the support strip 1 is coupled together with the support strip 15 in such a manner, that the bottom grooves 5 of the support strip 1 are pressed over the beads 8 of the side walls 16, whereafter the grip edges 6,7 of the support strip 1 embrace the beads 8 of the side wall 16, so that the support strip 1 is retained detachably against the support strip 15, in that the bead and the co-operating grip edges constitute a snap connection. As the support strip 15 and thereafter the support strip 1 are being attached in the manner described, they are provided, for example, with conduits, cables etc. indicated in FIG. 5 by dash-dotted lines. The support walls 10 being slightly elastic, the stop strips 11, when so required at the insertion of conduits and cables etc. can be pressed to the side so as to permit the conduits, cables etc. to pass inward, and thereafter the stop strips can reassume their original position and serve for retaining the conduits, cables, etc. which now are supported on respective walls 3,10,16. The two support strips 1,15 are thereafter covered by a cover section 21 which is in detachable engagement with the shoulders 9 of the support strip 15.

FIG. 6 shows the support strip 15 coupled together with a known electric strip 22 of plastic comprising six bare wires 23 baked-in therein, in such a manner, that one groove 5 of the support strip 15 and grip edges 6,7 engage with a bead 24 on an edge strip 25 of the electric strip 22 which, besides, is provided with shoulders 26 for engagement of a cover section 27 with the shoulders, as shown in FIG. 6. The cover section 27 thereafter contributes to supporting the support strip 15.

The designs shown in FIGS. 5 and 6 can be modified, for example, in that in FIG. 5 the support strips 1,15 change place, or that more than two support strips are coupled together, and in FIG. 6 that the support strip 15 is replaced by or provided in addition with the support strip 1.

The invention must not be regarded restricted to the designs described and illustrated in the drawing, as they can be modified within the scope of the invention. The configuration, for example, of the side walls and support walls can be varied according to demand, and the support walls possibly may be omitted.

I claim:

1. A support strip of plastic material with substantially U-shaped cross-section for supporting conduits, cables etc. and comprising a substantially plane bottom (2) and side walls (3), characterized in that the support strip (1,15) in its bottom surface at each of its longitudinal outer portions is provided with a groove (5), which extends along the entire support strip (1,15) and along its entire length is formed with opposed grip edges (6,7), that the free outer edge of each side wall (3,16) along its entire length is formed with a bead (8) constituting in cross-section almost a whole circle area, the diameter of which is slightly smaller than the width of the groove (5) and slightly greater than the distance between the grip edges (6,7), and that the beads (8) of the support strip (1,15) are located at equal distance from the bottom (2) of the support strip and in a plane (x) extending perpendicularly to the bottom (2) and in the central longitudinal line of the groove (5).

2. A support strip as defined in claim 1, characterized in that from the inside of the bottom (2) one or more support walls (10) project in parallel with the side walls (3,16) and spaced from each other, of which support walls the outer edge is formed with stop strips (11) projecting on each side of the respective wall (10), that the side walls (3,16) each have their stop edge or stop strip (12,17) flushing with said stop strips on the support walls, and that all stop strips (11) and stop edges (12,17) have a slightly shorter distance to the bottom (2) of the support strip than the beads (8).

3. A support strip as defined in claim 1 or 2, characterized in that the support strips (1,15) have the same mutual distance between their grooves (5) and between their beads (8), so that the support strips can be coupled together optionally one adjacent the other, with their grooves and beads engaging with each other.

* * * * *